Sept. 16, 1969  M. WEINER  3,467,840

SOLAR THERMIONIC CONVERTOR

Filed July 5, 1966

Melvin Weiner
INVENTOR.

United States Patent Office 3,467,840
Patented Sept. 16, 1969

3,467,840
SOLAR THERMIONIC CONVERTOR
Melvin Weiner, 54 Harvard Ave.,
Brookline, Mass. 02111
Continuation-in-part of application Ser. No. 253,466,
Jan. 23, 1966. This application July 5, 1966, Ser.
No. 563,346
Int. Cl. H02n 3/00
U.S. Cl. 310—4                                        4 Claims

ABSTRACT OF THE DISCLOSURE

A solar concentrating system, consisting of a paraboloidal reflector with a subtended half-angle of approximately 30 degrees at its focal plane followed by a truncated light pipe with a tapering angle of approximately two degrees, provides a larger and more uniform heating of the cathode surface of a thermionic convertor at the focus of said concentrating system.

---

This invention relates to solar concentrators and to systems which utilize high intensity solar energy. In particular, this invention relates to such solar powered systems as optical masers, high temperature furnaces and thermionic convertors.

The most common type of solar concentrator for such systems consists of a paraboloidal reflector with the solar energy concentrated at the focal plane of the reflector. Another type of concentrator often used is a spherical reflector which, although it has less potential concentrating power than a paraboloidal reflector, is advantageous when the axis of the reflector is not always pointed in the direction of the sun. Other types of concentrators may consist of multiple reflectors such as in a Cassagrainian or Newtonian optical system and each reflector may have axial cross-sections which are approximately parabolic, cylindrical, hyperbolic, elliptical or combinations of these shapes.[1] One particular property shared by these concentrators is that they are all image forming; i.e. except for spherical abberation and coma, there is a one to one correspondence between an object point on the sun's solar disk to an image point at the focal plane of the concentrator. Therefore, the solar energy intensity at the focal plane of these concentrators is not uniform and is usually described as having a "bell-shaped" distribution of energy intensity.

Still other types of solar concentrators are non-image forming and have been reported previously.[2,3] These types of concentrators have consisted of truncated conical reflectors or truncated pyramidal reflectors whose reflecting sides are on the inner surface. After many reflections, the solar energy is concentrated at the smaller base of the truncated reflector and is essentially uniform over its area.

However, a solar concentrator is not only characterized by the distribution of solar energy at its focal plane but also by the magnitude of the solar energy intensity at its focal plane. If $A_p$ is the aperture area of a solar concentrator, $A_t$ is the area of the focal plane in which all the non-absorbed incident energy is concentrated, and $T$ is the fraction of energy not absorbed by losses in the concentrator system, then it can be shown that the concentrating power given by $A_p T/A_t$ for any concentrator can never be more than $n^2\omega(1-\omega/4\pi)/\Omega$ where $n$ is the index of refraction of the concentrating medium, $\omega$ is the solid angle of solar energy at the focal plane of the concentrator, and $\Omega$ is the solid angle subtended by the sun at the aperture of the concentrator. The solid angle $\Omega$ is approximately $0.68 \times 10^{-4}$ steradians for a concentrator on the earth's surface. The maximum potential concentrating power that can be attained by any solar concentrator on earth is approximately $46{,}200 n^2$ corresponding to a solid angle of energy collection of $\omega = 2\pi$ steradians. Therefore, in addition to the distribution of solar energy at its focal plane, a solar concentrator is also characterized by its concentrating power or its concentrating efficiency given by $(A_p T/A_t)/(46{,}200 n^2)$.

Of the image forming types of solar concentrators mentioned above, the paraboloidal reflector is the most commonly used because of its high potential concentrating power. The fraction of energy $T$ transmitted to its focal plane is approximately 0.9 assuming an absorption loss of 0.1 for a single reflection at its reflector surface. For maximum concentrating power, determined by designing the solid angle $\omega$ to be equal to $\pi$ steradians so that spherical aberration and coma are not to excessive, the corresponding cone angle of energy collection at the focal plane is 120 degrees. The concentrating power for such a paraboloid is approximately 17,500 with a corresponding concentrating efficiency of 0.378.

A technique that has been used to increase the concentrating power of image forming types of concentrators has been the use of "immersion optics" in which the target to be illuminated is immersed in an approximately spherical shaped transparent medium of index of refraction $n$ greater than one. Such a technique allows the use of a paraboloid of longer focal length with less spherical aberration and coma without reducing the solid angle of light collection $\omega$. Immersion optics also increases the potential concentrating power by reducing the effective solid angle of solar energy $\Omega$ at the aperture of the concentrator.

In contrast, the non-image forming concentrators reported previously[2,3] have very low concentrating powers because most of the energy is absorbed after several reflections. Even if the power absorbed were negligible, the axial length of the concentrators required for optimum concentrating power is too long for practical construction.

In summary, the prior art of solar concentrators has achieved either high concentrating powers with a non-uniform distribution of solar energy at the focal plane or low concentrating powers with a highly uniform distribution of solar energy at the focal plane.

The chief objects of the invention described herein are

A solar concentrator with substantially greater concentrating power than that obtained by paraboloidal reflectors of the same mechanical tolerances of construction;

A solar concentrator which simultaneously provides a highly uniform distribution of solar energy at the focal plane; and A solar concentrator system with greater operating efficiency derived from the utilization of higher intensity, more uniformly distributed solar energy with particular application to optical masers, high temperature furnaces, and thermionic converters.

The above objects are realized in an embodiment of the present invention, wherein incident solar energy is concentrated by a compound optical system consisting of an image forming convergent lens of medium $f$/number and a non-image forming convergent lens of low $f$/number. The image forming lens concentrates the solar energy to a small area with little spherical aberration or coma. The non-image forming lens, whose aperture is located at the focal plane of the image forming lens, concentrates the concentrated solar energy to a still smaller area by a process of multiple reflections with little transmission loss. The resulting solar energy at the focal plane of the non-image forming lens is then utilized for such solar

---

[1] W. A. Baum and J. P. Strong, Solar Furnace Support Studies, AFMDC TR 58-7 (also AD 135,014), pp. 57-88, 1958.
[2] W. Calver, U.S. Patent 294,117, Feb. 26, 1884.
[3] A. G. Eneas, U.S. Patents 670,916 and 670,917, Mar. 26, 1901.

powered applications as optical masers, high temperature furnaces, and thermionic converters.

More particularly, one specific embodiment of the present invention consists of a paraboloidal reflector serving as the image forming lens with an approximate $f$/number of ($f$/1.0), a truncated cone of transparent dielectric material such as sapphire serving as the non-image forming lens with an approximate $f$/number of ($f$/0.35), and the system utilization of the resulting concentrated solar energy at the smaller end of the truncated cone.

The above specific illustrative embodiment of the present invention is particularly well suited for optical maser (laser) application. For optical maser application, a negative medium in which stimulated emission of radiation can occur, such as chromium doped sapphire (ruby), is mated to the smaller end of the truncated cone so that the concentrated solar energy is transmitted to the negative temperature medium. The geometrical configuration of the negative temperature medium, among other possible configurations, can be wafer shaped with flattened pairs of parallel edges so that highly coherent and directional light beams are emitted in a plane perpendicular to the axis of the compound optical system or the medium can be rod shaped so that a highly coherent and directional light beam is emitted along the axis of the compound optical system. The above illustrative embodiment of the present invention achieves an optical pumping power of higher intensity and greater uniformity than previously achieved and allows for efficient continuous wave operation of an optical maser. Optical maser application is particularly well suited to the above embodiment because, in the process of amplification by stimulated emission, very little of the incident solar energy is converted to heat which if excessive could cause deterioration of the mechanical and optical properties of the truncated cone.

Deterioration of the mechanical and optical properties of the truncated cone, caused by excessive heating, is a potentially serious limitation of the above specific embodiment for applications in which high temperatures are generated such as in furnaces and thermionic converters. Nevertheless, at temperatures below the melting point of the truncated cone, one advantage of the above specific embodiment is that larger mechanical tolerances can be tolerated in the paraboloidal reflector to attain the same temperature as that of a sole paraboloidal reflector of closer mechanical tolerances. A second advantage is the highly uniform distribution of temperature at the heated target. For temperatures to approximately 3500 degrees centigrade, the above specific embodiment can be modified to utilize a truncated conical metallic reflector instead of a truncated dielectric cone so that the heated material need not come in physical contact with the conical reflector. This modified embodiment, despite its greater solid angle of energy collection and less aberration, is limited to attaining the same approximate temperature as that of a sole paraboloidal concentrator because of larger reflection losses. However, unlike the sole paraboloidal concentrator, the modified embodiment of the present invention produces a highly uniform distribution of temperature at the heated target. For temperatures substantially greater than 3500 degrees Centigrade, the unmodified specific embodiment of the present invention, can be utilized but with restricted operation. Furnaces and thermionic converters operating at these high instantaneous temperatures are restricted to operate over short intervals of time so that the average heating does not cause excessive deterioration of the truncated cone.

For some applications such as thermoelectric generators, photoelectro-generators, and heat exchangers, the desired concentrating power may be different for each of the two cross-sections. For such applications, the present invention need not have geometric symmetry about its longitudinal axis but may have correspondingly different cross-sections.

Furthermore, the image forming lens of the present invention need not be restricted to a parabolic reflector but may be any image forming convergent lens processing equal $f$/number with minimal spherical aberartion, coma, and transmission loss.

Furthermore, the non-image forming lens of the present invention need not have a truncated conical cross-section but can have any monotonic decreasing cross-section with an axial length of least as long as that of a truncated cone.

The features of the present invention are better understood from the following more detailed discussion taken in conjunction with the accompanying drawing, in which.

Figure 1:
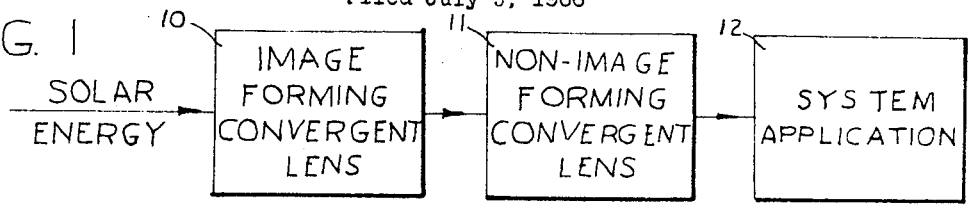
FIG. 1 is a block diagram of a solar concentrator system illustratively embodying aspects of the principles of the present invention.

Referring now to FIG. 1, a solar concentrator system is shown in which solar energy is incident on the aperture of an image forming convergent lens 10 and is concentrated by said lens to a small area in its focal plane. A non-image forming convergent lens 11, located at the focal plane of lens 10, concentrates the said solar energy by a process of multiple reflections to a still smaller area in its own focal plane. The solar energy, in final concentrated form, is then utilized by the desired system application 12 at the focal plane of lens 11.

Figure 2:
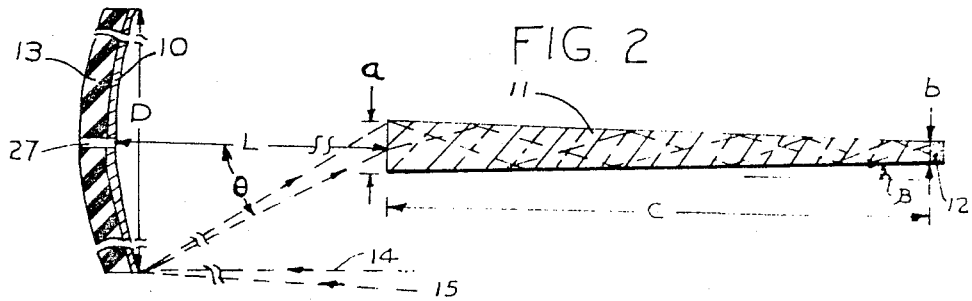
FIG. 2 is an axial cross-section of a solar concentrator system made in accordance with principles of the present invention.

An image forming convergent lens, which is consistent with the principles of the present invention, is shown in FIG. 2. The said lens consists of a reflector 10 of parabolic cross-section, aperture diameter D equal to approximately one meter, $f$/number equal to approximately ($f$/1.0), focal length L equal to approximately one meter, half-angle $\theta$ of solar energy concentration equal to approximately thirty degrees, image area in its focal plane of diameter $a$ equal to approximately one centimeter, and surface reflectivity R equal to approximately 0.9. The reflecting surface can consist of such materials as silver or aluminum supported by the surface 13 of parabolic cross-section. The surface 13 can be rigid, or it can be elastic, such as Mylar, so that it can be inflated for outer space applications. It is understood that cross-sections other than parabolic, such as circular, are applicable as are refractive lenses provided that spherical abberations and coma do not cause a substantially greater image diameter $a$ for the same $f$/number. It is further understood that the diameter D can be larger or smaller than one meter with corresponding changes in the dimensions L and $a$. An $f$/number equal to approximately ($f$/1.0) is chosen for lens 10 as a compromise between tolerable aberrations from lens 10 and tolerable transmission losses in lens 11. If lens 11 is made of materials with substantially less absorption loss than that of sapphire, the $f$/number of lens 10 can be designed to be larger. For a solar concentrating system of maximum concentrating power, the mechanical tolerances in the cross-sectional shape of lens 10 should be minimized. However, an important advantages of this invention is that it can attain the same concentrating power, utilizing a lens 10 of medium $f$/number and large mechanical tolerances, as that of a solar concentrator consisting of a sole parabolic reflector of lower $f$/number and smaller mechanical tolerances.

A non-image forming convergent lens, which is consistent with the principles of the present invention, is shown in FIG. 2. The said lens consists of a transparent dielectric material 11 of truncated conical cross-section. For a material such as sapphire, the aperture diameter $a$ is equal to approximately one centimeter, the focal plane area of diameter $b$ is equal to approximately 0.4 centimeter, the axial length $c$ is equal to approximately ten centimeters, the cone half-angle $\beta$ is equal to approximately two degrees, the $f$/number is equal to approximately ($f$/0.4), the index of refraction $n$ is equal to approximately 1.75, and the transmissivity is approximately 75%.

The optical properties of lens 11 are illustrated by solar rays 14 and 15. Ray 14 orignates from the center of the solar disk and is parallel to the axis of the solar concentrator system. Ray 14 is reflected by lens 10 to the center of the aperture of lens 11. In accordance with Snell's Law, the ray is bent toward the aperture normal and travels in a straight line until it reaches the boundary between lens 11 and space. If the angle of incidence with the normal to the tapered surface is greater than a critical angle $\theta_c$ determined by the relation $\theta_c = \arcsin(1/n)$, the ray will be totally reflected at an angle equal to the angle of incidence. After several such reflections, ray 14 will reach the focal plane of diameter $b$ provided the cone half-angle $\beta$ is sufficiently small as determined by well known ray tracing techniques. Otherwise, ray 14 will be reflected back out of the aperture or be refracted out of the tapered surface. It should be noted that ray 14 does not generally end up at the center of the focal plane of lens 11 but at a random point in the focal plane. Ray 15 originates from the edge of the solar disk and makes an angle of 32 minutes with the axis of a solar concentrator system located on the earth's surface. Ray 15 is reflected by lens 10 to the edge of the aperture of lens 11. After a process of refraction and multiple reflections, ray 15 ends up in the focal plane at an arbitrary point relative to that of ray 14.

An advantage of this invention is its capability to effectively scramble incident solar energy to create a uniform distribution in its focal plane. With the above numerical values for the parameters of lens 10 and lens 11, another advantage is the invention's concentrating power of 42,000 as compared with a maximum of 17,500 for a sole paraboloidal reflector. It is also significant that both advantages occur simultaneously rather than one occurring at the expense of the other.

Lens 11, being of relatively small dimensions, can be controlled to have a high degree of optical homogeneity, precision, and transmissivity. It is understood that said lens need not be sapphire but any material of sufficient transparency and index of refraction, such as crown glass, rock salt, sylvite, fluorite, or quartz, depending upon the particular system application 12. It is further understood that lens 11 need not have a truncated conical cross-section but can have any monotonic decreasing cross-section provided that end diameters $a$ and $b$ are respectively equal to those of a truncated cone and that the axial length $c$ is no shorter than that of a truncated cone. Lens 11 can conveniently be supported by a tripod attachment to lens 10 or may be supported by the system application 12.

The concentrated solar energy illuminates a material body 12, shown in FIG. 2, located at the focal plane of lens 11 and in close physical contact with lens 11. The nature of the material body 12 depends upon the particular system application. The material body 12 must be in close physical contact with lens 11 so that solar energy will not be internally reflected back out the aperture because of an air or vacuum interface between lens 11 and material 12. Also to prevent internal reflection at the interface, material 12 should preferably have an index of refraction at least as large as that of lens 11 for applications not requiring heating or should have a large emissivity coefficient for applications requiring heating.

Figure 3:
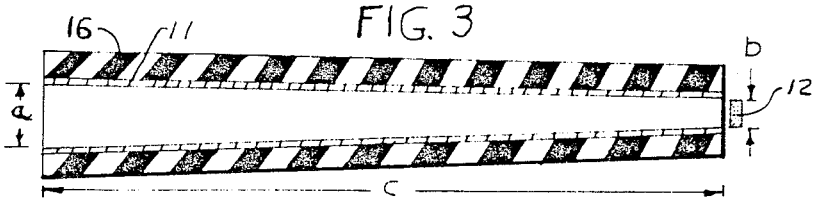
FIG. 3 is an axial cross-section of a modified solar concentrator system made in accordanue with principles of this invention.

For solar furnace application, material 12 should preferably have a large emissivity coefficient or be coated with a material of high emissivity, such as carbon black, to convert the incident electromagnetic energy to heat. One advantage of this invention for solar furnace application is the high uniformity of temperature at the surface of material 12. In addition, the solar concentrator system of FIG. 2, with the above numerical values for the system parameters, can attain instantaneous temperatures in excess of 90% of the sun's nominal surface temperature compared with temperatures of less than 60% for that of a sole paraboloidal reflector. However, at such high temperatures, a shutter must be placed in front of lens 11 for intermittent operation to prevent deterioration of the optical and mechanical properties of lens 11. For continuous operation at temperatures above the melting point of suitable materials for lens 11, FIG. 3 shows an alternate configuration of lens 11. A highly reflecting metal 11, such as silver or aluminum, covers the inside surface of a rigid support 16 in the shape of a truncated cone with a tapering angle $\beta$ a little larger than that of an internally reflecting truncated cone. The material body 12 to be heated is at the smaller end of the truncated cone and is in optical contact with it. The concentration efficiency of this modified configuration is less than that of a dielectric truncated cone because metallic reflection losses are greater than dielectric absorption losses and because the increase in solid angle of light collection does not compensate for the loss of the refractive reduction of the solid angle of incident solar energy.

Figure 4:
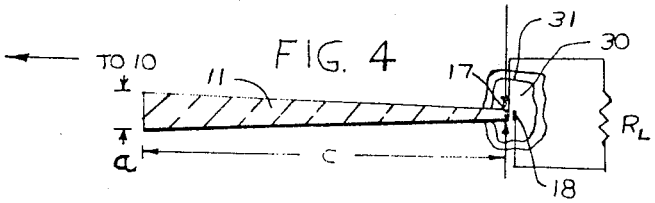
FIG. 4 is an axial cross-section of a solar thermionic convertor made in accordance with principles of this invention.

For thermionic converter application, the material body 12 is of a low photoelectric work function and forms the cathode 17 of a thermionic convertor tube as shown in FIG. 4. The other components of the thermionic convertor tube are the anode 18, vacuum 30 (or partially ionized gas such as cesium to reduce space charge), a tube envelope 31, and an impedance load $R_L$ which is connected across the cathode and anode. The tube's efficiency of delivering electric power to an external load $R_L$ increases with increasing temperature and uniformity of temperature of its cathode. The present invention provides higher temperatures and more uniform temperature at the cathode than the present state of the art. The present invention is particularly advantageous for outer space applications because it allows for an inflatable lens 10 with larger mechanical and alignment tolerances than could be allowed in the present state of the art.

Figure 5:
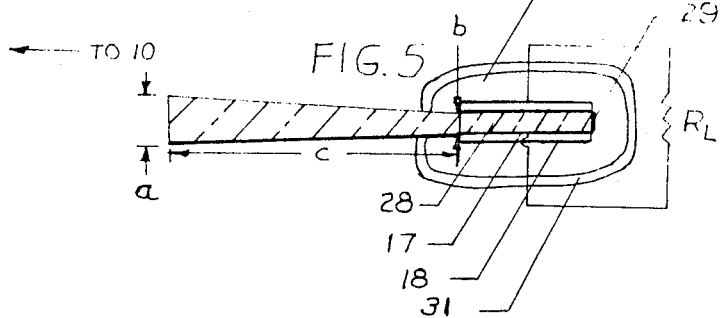
FIG. 5 is an axial cross-section of a modified solar thermionic convertor made in accordance with principles of this invention.

The cathode 17 need not adjoin the smaller base of the truncated cone 11 but instead can be in optical contact with the outer surface of another light pipe 28 which adjoins the truncated cone 11 as shown in FIG. 5. The light pipe 28 is preferably of the same material as the truncated cone 11. The surface of the light pipe may be coated with material of high emissivity to improve the heating of the cathode 17 which is in optical contact with the light pipe 28 and the high emissivity material. The non-adjoining base 29 of the light pipe 28 is coated to reflect solar energy so that the absorbing path length of the light pipe 28 is doubled.

What is claimed is:
1. A solar powered thermionic convertor comprising,
   reflector means for collecting and concentrating solar energy to within a linear acute half angle at its focal plane,
   a first light pipe that is truncated with a tapering angle that is much smaller than said linear acute half angle and having a larger base substantially at said focal plane and a smaller base at the other end thereof,
   a second light pipe having one base adjoining said smaller base,
   said second light pipe having its other base coated to reflect solar energy, its lateral surfaces comprising means for absorbing the incident solar energy, and said second light pipe comprising means for transmitting solar energy,
   and a thermionic convertor tube having a cathode substantially in optical contact with said lateral surfaces.
2. A solar powered thermionic converter comprising,
   a reflector for collecting and concentrating solar energy to within an acute linear half angle substantially at its focal plane,
a truncated cone of solar energy carrying dielectric material having a tapering angle much smaller than said acute linear half angle and having a larger base substantially at said focal plane and a smaller base,
a solar energy carrying dielectric rod having one base adjoining said smaller base,
said dielectric rod comprising means for transmitting solar energy and having its other base coated with reflecting means for reflecting solar energy and having lateral surfaces comprising means for absorbing the incident solar energy,
and a thermionic convertor tube having a cathode substantially in optical contact with said lateral surfaces.

3. A solar powered thermionic convertor comprising of
a paraboloidal reflector which collects and concentrates solar energy to within a linear half angle of approximately 30 degrees at its focal plane,
a truncated light pipe with a tapering angle of approximately two degrees, whose larger base is at the focal plane of the paraboloidal reflector,
a light pipe of preferably the same material as the truncated light pipe, with one base adjoining the smaller base of the truncated light pipe and transmitting solar energy, its other base coated to reflect solar energy, whose lateral surfaces absorb the incident solar energy, and
a thermionic convertor tube whose cathode is in optical contact with the lateral surfaces of the light pipe.

4. A solar powered thermionic convertor comprising of
a paraboloidal reflector which collects and concentrates solar energy to within a linear half angle of approximately 30 degrees at its focal plane,
a truncated cone, of transparent dielectric material, with a tapering angle of approximately two degrees, whose larger base is at the focal plane of the paraboloidal reflector,
a transparent dielectric rod, of preferably the same material as the truncated cone, with one base adjoining the smaller base of the truncated cone and transmitting solar energy, its other base coated to reflect solar energy, whose lateral surfaces absorb the incident solar energy, and
a thermionic convertor tube whose cathode is in optical contact with the lateral surface of the dielectric rod.

References Cited
UNITED STATES PATENTS

| | | | |
|---|---|---|---|
| 294,117 | 2/1884 | Calver | 126—271 |
| 3,026,439 | 3/1962 | Geer | 322—2 XR |
| 3,155,849 | 11/1964 | Haring et al. | 310—4 |
| 3,313,961 | 4/1967 | Bensimon et al. | 310—4 |

MILTON O. HIRSHFIELD, Primary Examiner

D. F. DUGGAN, Assistant Examiner

U.S. Cl. X.R.

126—271